US011892010B2

(12) United States Patent
Lee

(10) Patent No.: US 11,892,010 B2
(45) **Date of Patent: *Feb. 6, 2024**

(54) COMBUSTIBLE GAS COMPRESSOR

(71) Applicant: CLUSTER LNG CO., LTD., Geoje-si (KR)

(72) Inventor: Jung Han Lee, Geoje-Si (KR)

(73) Assignee: CLUSTER LNG CO., LTD., Geoje-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,904

(22) Filed: Dec. 17, 2021

(65) Prior Publication Data

US 2022/0106967 A1 Apr. 7, 2022

Related U.S. Application Data

(63) Continuation of application No. 17/255,243, filed as application No. PCT/KR2019/007588 on Jun. 24, 2019.

(30) Foreign Application Priority Data

Jun. 25, 2018 (KR) ........................ 10-2018-0072743

(51) Int. Cl.
*F04D 29/42* (2006.01)
*F04D 25/06* (2006.01)
(Continued)

(52) U.S. Cl.
CPC ..... *F04D 29/4206* (2013.01); *F04D 25/0606* (2013.01); *F04D 29/056* (2013.01);
(Continued)

(58) Field of Classification Search
CPC .. F04D 29/4206; F04D 29/056; F04D 29/102; F04D 29/284; F04D 29/083;
(Continued)

(56) References Cited

U.S. PATENT DOCUMENTS 4,125,345 A * 11/1978 Yoshinaga .......... F04D 25/0606 417/244
5,888,053 A * 3/1999 Kobayashi .......... F04D 29/4266 417/244
(Continued)

FOREIGN PATENT DOCUMENTS

CN 102734172 A 10/2012
CN 106662116 A 5/2017
(Continued)

OTHER PUBLICATIONS

International Search Report of PCT Application No. PCT/KR2019/007588—4 pages (dated Sep. 25, 2019).
(Continued)

*Primary Examiner* — Brian P Wolcott
(74) *Attorney, Agent, or Firm* — Knobbe, Martens, Olson & Bear, LLP

(57) ABSTRACT

Provided is a combustible gas compressor for compressing combustible gas. The combustible gas compressor comprising: a compressor housing having an impeller rotatably disposed therein; a motor housing having a motor for driving the impeller therein; and a bearing rotatably supporting a rotational shaft transmitting rotation driving force of the motor to the impeller, wherein the compressor housing is integrally formed with the motor housing, the bearing is a self-lubricating type bearing not using lubricant oil, the self-lubricating type bearing being configured to lift the rotational shaft using gas.

9 Claims, 2 Drawing Sheets

(51) Int. Cl.
*F04D 29/056* (2006.01)
*F04D 29/10* (2006.01)
*F04D 29/28* (2006.01)

(52) U.S. Cl.
CPC .......... *F04D 29/102* (2013.01); *F04D 29/284* (2013.01); *F05D 2250/51* (2013.01); *F05D 2250/52* (2013.01)

(58) Field of Classification Search
CPC .. F04D 29/5853; F04D 25/0606; F04D 17/10; F04D 17/12; F04D 17/122
See application file for complete search history.

(56) References Cited

U.S. PATENT DOCUMENTS

| | | | | |
|---|---|---|---|---|
| 6,196,809 | B1 * | 3/2001 | Takahashi | F04D 25/16 417/243 |
| 6,375,438 | B1 * | 4/2002 | Seo | F25B 31/006 415/111 |
| 6,450,781 | B1 * | 9/2002 | Petrovich | F04D 25/16 62/505 |
| 6,579,078 | B2 * | 6/2003 | Hill | F16C 33/10 417/228 |
| 7,193,341 | B2 * | 3/2007 | Bosen | F04D 25/06 310/58 |
| 7,856,834 | B2 * | 12/2010 | Haley | F04D 29/441 62/115 |
| 9,879,827 | B2 * | 1/2018 | Hwang | F04D 17/12 |
| 10,794,619 | B2 * | 10/2020 | Knopp | H02K 1/32 |
| 10,876,546 | B2 * | 12/2020 | Okada | F04D 29/58 |
| 11,009,043 | B2 * | 5/2021 | Kim | F04D 29/5806 |
| 2015/0184617 | A1 * | 7/2015 | Kim | F02D 19/0665 123/495 |
| 2015/0308456 | A1 * | 10/2015 | Thompson | F04D 17/12 417/244 |

FOREIGN PATENT DOCUMENTS

| | | | | | |
|---|---|---|---|---|---|
| CN | 112983849 | A | * | 6/2021 | F04D 17/122 |
| CN | 112983849 | A | | 6/2021 | |
| EP | 3361104 | A1 | * | 8/2018 | F04D 17/08 |
| EP | 3361104 | A1 | | 8/2018 | |
| JP | H06-207599 | A | | 7/1994 | |
| JP | H06-43519 | Y2 | | 11/1994 | |
| JP | 2012-211530 | A | | 11/2012 | |
| JP | 2013-207864 | A | | 10/2013 | |
| JP | 2013207864 | A | * | 10/2013 | |
| JP | 2016-033348 | A | | 3/2016 | |
| JP | 2016-173098 | A | | 9/2016 | |
| JP | 2016173098 | A | * | 9/2016 | |
| KR | 10-2012-0112083 | A | | 10/2012 | |
| KR | 10-2017-0055399 | A | | 5/2017 | |
| KR | 10-2017-0137604 | A | | 12/2017 | |
| KR | 10-1845833 | B1 | | 4/2018 | |
| KR | 10-2239812 | B1 | | 4/2021 | |
| KR | 102239812 | B1 | * | 4/2021 | |

OTHER PUBLICATIONS

Office Action issued in the parent application, U.S. Appl. No. 17/255,243, in 27 pages (dated May 9, 2022).
Extended European Search Report in Application No. 19826933.4 dated Feb. 2, 2022 in 9 pages.
Office Action in Japanese Application No. 2020573417 dated Nov. 29, 2021 in 4 pages.
Office Action in Indonesian Application No. P00202100541 dated Feb. 15, 2022 in 2 pages.
Office Action in Chinese Application No. 201980042916.4 dated Dec. 21, 2021 in 7 pages.
Final Office Action dated Sep. 27, 2022 in the parent application, U.S. Appl. No. 17/255,243.

* cited by examiner

COMBUSTIBLE GAS COMPRESSOR

INCORPORATION BY REFERENCE TO ANY PRIORITY APPLICATIONS

This application is a Continuation of U.S. application Ser. No. 17/255,243 filed on Dec. 22, 2020, which is a U.S. National Stage of PCT/KR2019/007588 filed on Jun. 24, 2019, which claims the priority benefit of Korean Patent Application No. 10-2018-0072743 filed on Jun. 25, 2018 in the Korean Intellectual Property Office. Any and all applications for which a foreign or domestic priority claim is identified in the Application Data Sheet as filed with the present application are hereby incorporated by reference under 37 CFR 1.57.

BACKGROUND

Field

The present disclosure relates to a boil-off gas compressor for LNG-fueled vessels using LNG as fuel for propulsion engines thereof, and more particularly, to a boil-off gas compressor for LNG-fueled vessels, in which a compressor housing is integrally formed with a motor housing.

Related Technology

In general, an LNG carrier vessel for transportation of liquefied natural gas (LNG) has used LNG as fuel. In recent years, however, various LNG-fueled vessels using LNG as main fuel, which is cheaper than oil and advantageous to meet regulations on exhaust gas in terms of prevention of environmental pollution, are being built in addition to the LNG carrier vessels.

The amount of LNG loaded in the LNG-fueled vessel to be used as fuel thereof is about 1/50 to 1/10 that of the LNG carrier vessel and the LNG-fueled vessel generates a much smaller amount of boil-off gas (BOG) in an LNG storage tank in proportion to the capacity of the storage tank than the LNG carrier vessel.

However, like the LNG carrier vessel, the LNG-fueled vessel requires efficient treatment of BOG in order to prevent a risk due to increase in pressure of the storage tank, despite generation of a relatively small amount of BOG. Moreover, since the main purpose of the LNG-fueled vessel is not transportation of LNG, the LNG-fueled vessel uses LNG as fuel and crews are not experts in handling LNG, it is necessary to simplify LNG-related systems and equipment.

In a vessel designed to use LNG as fuel for a main engine (for example, a propulsion engine), the amount of BOG generated in an LNG storage tank is much smaller than the amount of BOG consumed by the main engine and a fuel supply system including an LNG pump and an LNG vaporizer is generally used in order to reduce power for fuel compression. As a result, if BOG is not removed from the LNG storage tank, the internal pressure of the storage tank can continue to increase.

As a method of controlling the internal pressure of the storage tank, an LNG storage tank capable of enduring high pressure is prepared to prevent the internal pressure of the storage tank from increasing above a predetermined level by supplying fuel to an auxiliary engine including a generator by natural pressure of the storage tank. However, this method has difficulty maintaining the pressure in the LNG storage tank and an economical burden due to the preparation of the LNG storage tank which is expensive and has a high pressure.

The disclosure of this section is to provide background information relating to the present disclosure. Applicant does not admit that any information contained in this section constitutes prior art.

SUMMARY

An LNG-fueled vessel may be further provided with a BOG compressor. Despite a small capacity, extremely low temperature and low flow rate in the BOG compressor may cause the followings. In general, it may be difficult for a low-flow rate compressor to implement a centrifugal compressor. This is because the compressor requires operation at high speed due to the low flow rate and a small impeller size corresponding thereto. For such reasons, a screw type compressor or a reciprocation type compressor is typically used as the BOG compressor of the LNG-fueled vessel.

Due to characteristics of using a large amount of lubricant oil, the screw type compressor is provided at an outlet thereof with a complicated apparatus for removal of the lubricant oil in order to ensure the quality of LNG. In addition, since the screw type compressor cannot directly treat BOG having a low temperature, the screw type compressor is provided at an inlet thereof with a heater for protection of the compressor. As such, for use of the screw type compressor, various devices are added thereto, thereby causing deterioration in system reliability, and the compressor is operated at a relatively high temperature, causing deterioration in efficiency of the compressor.

The reciprocation type compressor also requires a separate lubricant system. In addition, the reciprocation type compressor is operated at a low RPM and thus is much larger and heavier than the centrifugal compressor.

For such reasons, although the centrifugal compressor is excellent in terms of volume or reliability, as compared with the screw type compressor or the reciprocation type compressor, it is very difficult to realize the centrifugal compressor due to a low flow rate thereof to be applied to the LNG-fueled vessel. In a typical LNG carrier vessel configured to treat a large amount of BOG, a high flow rate centrifugal BOG compressor is used. In this case, since a compressor impeller is required to operate at 20,000 RPM or more in order to obtain a certain compression rate, it is necessary to adopt a set-up gear box due to characteristics of an electric motor generally having a maximum rotational speed of about 3,600 RPM.

In a BOG compressor for LNG-fueled vessels, which has a relatively small capacity, the set-up gear box and the lubricant system provide significant disadvantages in terms of costs and simplification of overall equipment. Since the low-flow rate centrifugal compressor is required to operate at a high RPM, it is more difficult in terms of techniques to realize the low-flow rate centrifugal compressor than a large capacity centrifugal compressor.

Moreover, in all of the typical centrifugal, screw type, and reciprocation type compressors, an electric motor, compressor impellers, screws, and a cylinder are provided as separate components and leakage of a combustible gas inevitably occurs at connection sites between these components. To address foregoing, a gas sealing device is used in several stages. The gas sealing device is very expensive and requires continuous injection of an inert gas, such as nitrogen and the like, and a separate system for discharging a trace amount of gas leaked from the sealing device. Nevertheless, the sealing device cannot avoid or prevent leakage of the combustible gas, which may be unsafe. Since the electric motor is also disposed in a region where gas leakage can occur, the compressors require an explosion-proof electric motor, causing significant increase in costs.

Embodiments of the present invention provide a boil-off gas compressor for LNG-fueled vessels using LNG as fuel for propulsion engines thereof, in which a compressor housing is integrally formed with a motor housing to avoid, minimize or prevent leakage of a combustible gas, that is, boil-off gas, and inflow of external air.

Embodiments of the present invention provide a boil-off gas compressor for LNG-fueled vessels, which adopts a centrifugal compressor capable of compressing boil-off gas in a cryogenic state without heating the boil-off gas using an inlet heater, thereby improving compression efficiency.

Embodiments of the present invention provide a boil-off gas compressor for LNG-fueled vessels, which uses a self-lubricating bearing to prevent leakage of a lubricant oil influencing the quality of compressed boil-off gas and can obtain a target impeller RPM without using a set-up gear by increasing motor RPM through a high-frequency inverter.

In accordance with one aspect of the present invention, a boil-off gas compressor for LNG-fueled vessels using LNG as fuel for a propulsion engine thereof includes: a compressor housing having an impeller rotatably disposed therein; a motor housing having a motor for driving the impeller therein; and a bearing rotatably supporting a rotational shaft transmitting rotation driving force of the motor to the impeller, wherein the compressor housing is integrally formed with the motor housing.

The motor may be driven by a high speed frequency inverter and the impeller may be directly connected to the motor without a separate set-up gear.

The bearing may be a self-lubricating type bearing not using lubricant oil.

A set of the impeller and the compressor housing may be disposed at each of both sides of the motor housing.

The impeller may include a first impeller disposed at one side of the motor housing and a second impeller disposed at the other side of the motor housing, and boil-off gas compressed while passing through the first impeller may be cooled by an intermediate cooler and then supplied to the second impeller to be additionally compressed thereby.

The rotational shaft may extend into the compressor housing through a partition wall between the motor housing and the compressor housing; and the compressor housing may communicate with the motor housing through a gap between the rotational shaft and the partition wall to allow the boil-off gas to flow from the compressor housing to the motor housing.

The partition wall between the motor housing and the compressor housing may be provided with an insulating member. In addition, a portion of each of the partition wall and the insulating member through which the rotational shaft passes may be provided with an air-tightening/heating member having both an air-tightening function and a heating function to relieve decrease in temperature of the motor by the insulating member and the air-tightening/heating member.

The boil-off gas compressor may further include a pressure sensor detecting an interior pressure of the motor housing.

The motor housing may be formed with a supply hole through which a gas is supplied from an exterior to the motor housing and with a vent hole through which an interior gas is discharged.

Embodiments of the present invention provide a boil-off gas compressor for LNG-fueled vessels using LNG as fuel for propulsion engines thereof, in which a compressor housing is integrally formed with a motor housing to reduce, minimize or prevent leakage of a combustible gas, that is, boil-off gas, and inflow of external air.

Embodiments of the present invention provide a boil-off gas compressor for LNG-fueled vessels, which can efficiently compress boil-off gas generated in an LNG storage tank of an LNG-fueled vessel or a LNG carrier vessel through centrifugal compression before supply of the compressed boil-off gas to an engine, thereby preventing loss of the boil-off gas while maintaining the interior pressure of the LNG storage tank within a safe range.

Embodiments of the present invention provide a boil-off gas compressor for LNG-fueled vessels, which has a small overall volume, is inexpensive, is able to directly compress cryogenic boil-off gas without using a separate heater, and allows omission of a set-up gear box, a lubrication device, a gas sealing device, and an explosion-proof motor structure. In addition, the compressor housing is integrally formed with the motor housing, thereby providing advantages in terms of safety and maintenance by reducing or minimizing leakage of lubricant oil or gas using a simple structure.

Embodiments of the present invention provide a boil-off gas compressor for LNG-fueled vessels, which uses a self-lubricating bearing to prevent leakage of a lubricant oil influencing the quality of compressed boil-off gas and can obtain a target impeller RPM without using a set-up gear by increasing motor RPM through a high-frequency inverter.

DETAILED DESCRIPTION OF EMBODIMENTS

Hereinafter, embodiments of the present invention are described in detail with reference to the accompanying drawings.

For an LNG-fueled vessel, efficient use of boil-off gas is a very important issue in terms of not only economic feasibility but also environment. If boil-off gas (BOG) generated in the LNG-fueled vessel is not suitably treated, the boil-off gas may be necessarily discharged to the atmosphere in order to protect a storage tank. BOG mainly including methane gas has a global warming index about 23 times higher than carbon dioxide and thus discharge of the BOG from the LNG-fueled vessel may necessarily be strictly restricted.

Although a screw type compressor or a reciprocation type compressor is used for treatment of the boil-off gas in the LNG-fueled vessel, these compressors cannot directly treat cryogenic boil-off gas or can cause contamination of LNG products due to lubricant oil. When the centrifugal compressor has a small capacity, it is difficult to implement a compression system and the use of a set-up gear, and a gas sealing device may increase costs.

According to embodiments of the present invention, provided is a centrifugal compression-type boil-off gas compressor for LNG-fueled vessels using LNG as fuel for propulsion engines thereof, in which a compressor housing is integrally formed with a motor housing, thereby reducing, minimizing or preventing leakage of a combustible gas, that is, boil-off gas, and inflow of external air.

Figure 1:
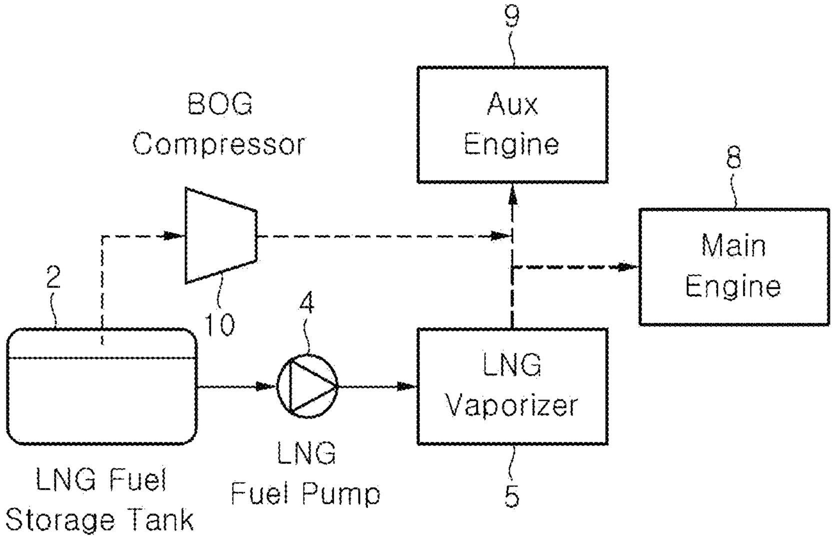
FIG. 1 is a conceptual view of a fuel supply system of an LNG-fueled vessel provided with a boil-off gas compressor according to embodiments of the present invention.

FIG. 1 is a conceptual view of a fuel supply system of an LNG-fueled vessel provided with a boil-off gas compressor according to embodiments of the present invention. Referring to FIG. 1, the fuel supply system of the LNG-fueled vessel includes a storage tank 2 adapted to store LNG and boil-off gas (that is, natural gas generated through vaporization of the LNG) to be used as fuel; and a main engine 8 and an auxiliary engine 9 that use the LNG and the boil-off gas as fuel supplied from the storage tank 2.

The main engine 8 may be a propulsion engine for providing propulsion force for navigation of the vessel, and the auxiliary engine 9 may be a power generation engine for supplying power to be consumed in the vessel.

LNG stored in the storage tank 2 may be compressed by an LNG pump 4 and may be supplied as fuel to at least one of the main engine 8 and the auxiliary engine 9 through an LNG vaporizer 5, in which the LNG is heated. Boil-off gas generated from the LNG inside storage tank 2 may be compressed by a boil-off gas compressor 10 according to embodiments of the present invention and then supplied as the fuel to at least one of the main engine 8 and the auxiliary engine 9.

The LNG compressed and heated by the LNG pump 4 and the LNG vaporizer 5 may be mainly supplied as fuel to the main engine 8, and the boil-off gas compressed by the boil-off gas compressor 10 may be mainly supplied as fuel to the auxiliary engine 9.

If the amount of the boil-off gas generated in the storage tank is less than a fuel amount required for the auxiliary engine 9, some of the fuel gas (that is, compressed and heated LNG) supplied to the main engine 8 can be supplied as fuel to the auxiliary engine 9. Here, if the pressure of the fuel gas required for the auxiliary engine 9 is lower than the pressure of the fuel gas required for the main engine 8, the fuel gas can be decompressed by a decompressor, such as a J-T valve and the like, before the auxiliary engine 9.

On the other hand, if the pressure of the boil-off gas compressed by the boil-off gas compressor 10 cannot satisfy the pressure of the fuel gas required for the main engine 8 and the amount of the boil-off gas generated in the storage tank is larger than the amount of the fuel gas for the auxiliary engine 9, some of fuel gas (that is, compressed and heated boil-off gas) supplied to the auxiliary engine 9 can be supplied to the main engine 8.

It should be noted that FIG. 1 shows one example of the fuel supply system of the LNG-fueled vessel provided with the boil-off gas compressor 10 according to embodiments of the present invention, and that the boil-off gas compressor 10 according to embodiments of the present invention may be provided to other types of fuel supply systems as well as the fuel supply system shown in FIG. 1. In addition, the boil-off gas compressor 10 according to embodiments of the present invention may be applied not only to a fuel supply system for supplying boil-off gas as fuel to an engine, but also to any system requiring compression of the boil-off gas. Further, a material to be compressed by the boil-off gas compressor 10 according to embodiments of the present invention is not restricted to boil-off gas, that is, natural gas, and may include a gas vaporized from LPG or oil and any kinds of combustible gas that can be exploded.

Figure 2:
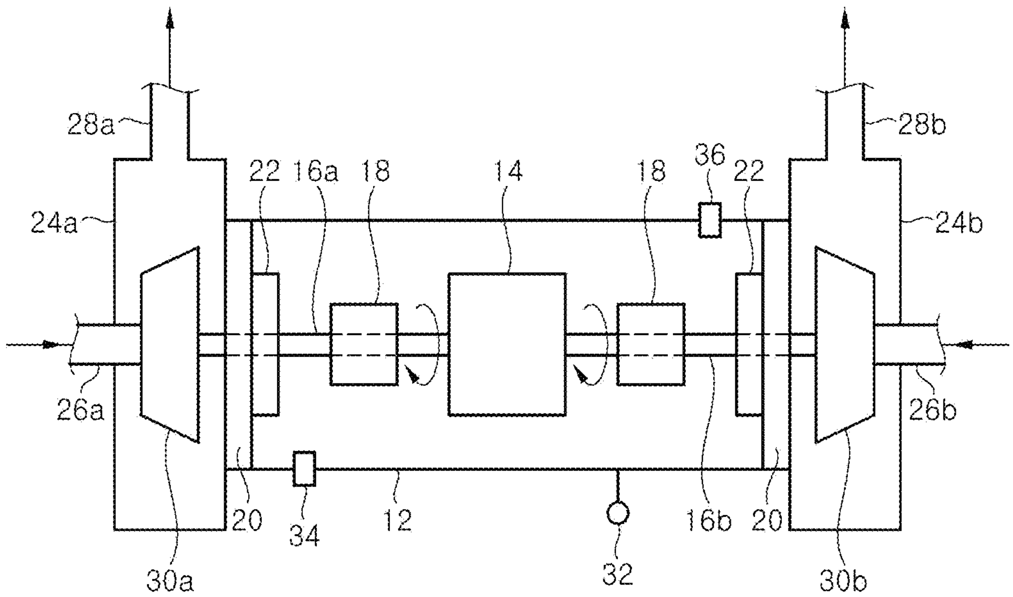
FIG. 2 is a schematic side view of a boil-off gas compressor for LNG-fueled vessels according to one embodiment of the present invention.

FIG. 2 is a schematic side view of a boil-off gas compressor for LNG-fueled vessels according to one embodiment of the present invention.

Referring to FIG. 2, the boil-off gas compressor 10 according to the embodiment includes compressor housings 24*a*, 24*b* each having an impeller 30*a* or 30*b* rotatably disposed therein, and a motor housing 12 in which a motor 14, for example, an electric motor, for driving the impellers 30*a*, 30*b*, is disposed. A set of the impeller 30*a* or 30*b* and the compressor housing 24*a* or 24*b* may be disposed at each of both sides of the motor housing 12. In FIG. 2, the impeller and the compressor housing disposed at the left side of the motor housing 12 are referred to as a first impeller 30*a* and a first compressor housing 24*a*, and the impeller and the compressor housing disposed at the right side of the motor housing 12 are referred to as a second impeller 30*b* and a second compressor housing 24*b*.

According to this embodiment, the motor housing 12 is integrally formed with the first and second compressor housings 24*a*, 24*b*. Here, the expression "motor housing is integrally formed with the compressor housing (or integrated therewith)" means that, outwardly, the motor housing 12 is connected to the compressor housings 24*a*, 24*b* as one body and that the motor housing 12 is placed adjacent the compressor housings 24*a*, 24*b* such that the boil-off gas leaked from the compressor housings 24*a*, 24*b* can flow into the motor housing 12.

Although FIG. 2 shows the boil-off gas compressor 10 in which sets of the impellers 30*a*, 30*b* and the compressor housings 24*a*, 24*b* are disposed at both sides of the motor housing 12, respectively, the impellers and the compressor housings may be disposed only at one side of the motor housing.

In the structure wherein the sets of the impellers 30*a*, 30*b* and the compressor housings 24*a*, 24*b* are disposed at both sides of the motor housing 12, respectively, as shown in FIG. 2, rotation driving force of the motor 14 is transferred to the first impeller 30*a* through a first rotational shaft 16*a* and to the second impeller 30*b* through a second rotational shaft 16*b*. Here, the first rotational shaft 16*a* and the second rotational shaft 16*b* may be coaxial shafts.

Each of the first rotational shaft 16*a* and the second rotational shaft 16*b* may be rotatably supported by a bearing 18. In this embodiment, the bearing 18 is a self-lubricating type bearing which does not use lubricant oil. Use of the self-lubricating type bearing can reduce or minimize contamination caused by the boil-off gas and allows omission of a lubricant supply system, thereby simplifying the overall configuration of the compressor. For example, the self-lubricating type bearing may be a bearing configured to lift the rotational shafts using gas or electromagnetic force.

The first rotational shaft 16*a* extends into the first compressor housing 24*a* through a partition wall between the motor housing 12 and the first compressor housing 24*a* and is coupled to the first impeller 30*a* to rotate the first impeller 30*a* upon operation of the motor 14. Likewise, the second rotational shaft 16*b* extends into the second compressor housing 24*b* through a partition wall between the motor housing 12 and the second compressor housing 24*b* and is coupled to the second impeller 30*b* to rotate the second impeller 30*b* upon rotation of the motor 14.

Each of the partition walls between the motor housing 12 and the first and second compressor housings 24*a*, 24*b* is provided with an insulating member 20, which may prevent cold heat of the boil-off gas having a very low temperature from being transferred into the motor housing 12. Each of portions of the partition walls and the insulating members 20 through which the first and second rotational shafts 16*a*, 16*b* pass is provided with an air-tightening/heating member 22. The insulating members 20 and the air-tightening/heating members 22 may prevent excessive decrease in temperature of the motor 14, thereby preventing adverse influence on devices, such as the motor 14 and the like.

In order to prevent the boil-off gas flowing in the first and second compressor housings 24*a*, 24*b* from being heated by the air-tightening/heating member 22, the insulating member 20 is advantageously disposed between each of the air-tightening/heating members 22 and each of the first and second compressor housings 24*a*, 24*b*.

Referring to FIG. 2, the first compressor housing 24*a* is formed with a first inlet 26*a* extending in an axial direction to allow the boil-off gas to be supplied to the first impeller 30*a* therethrough, and a first outlet 28*a* extending in the perpendicular direction to the axial direction to allow the boil-off gas heated by the first impeller 30*a* to be discharged therethrough. The second compressor housing 24*b* is also formed with a second inlet 26*b* extending in the axial direction to allow the boil-off gas to be supplied to the second impeller 30*b* therethrough, and a second outlet 28*a* extending in the perpendicular direction to the axial direction to allow the boil-off gas heated by the second impeller 30*b* to be discharged therethrough.

The motor housing 12 may be provided with a pressure sensor 32 to detect the interior pressure of the motor housing 12. In addition, the motor housing 12 may be provided with at least one temperature sensor. The temperature sensors may be provided not only to the motor housing but also to other places, such as the compressor housings and the like, which require temperature detection.

The motor housing 12 may be formed with a supply hole 34 through which a gas is supplied from the outside into the motor housing 12, and a vent hole 36 through which the gas is discharged from the motor housing 12. The supply hole 34 may be used to supply an inert gas such as nitrogen into the motor housing 12, for example, upon maintenance, assembly, and disassembly of the boil-off gas compressor.

Each of the first and second inlets 26*a*, 26*b* and the first and second outlets 28*a*, 28*b* may be provided with a flange to facilitate connection of a pipe thereto.

Next, operation and effects of the boil-off gas compressor according to this embodiment will be described.

In the boil-off gas compressor 10 according to this embodiment, even when boil-off gas having a very low temperature is directly introduced into the first and second compressor housings 24*a*, 24*b*, the insulating member 20 blocks heat transfer to the boil-off gas having a very low temperature, thereby preventing operation of the electric motor 14, which operates at high RPM, from being influenced by heat transfer. In addition, a connecting portion between each of the first and second compressor housings 24*a*, 24*b* and the motor housing 12 may be provided with a separate heater having an air-tightening function, that is, the air-tightening/heating member 22, to protect the electric motor. Further, heat due to operation of the electric motor 14 can be discharged through a jacket type cooling system provided to the motor housing 12.

The first and second impellers 30*a*, 30*b* requiring a high RPM are directly connected to the motor 14 without a set-up gear. The motor 14, that is, a high speed electric motor, may be driven by a high speed frequency inverter, which may be disposed outside the motor housing 12.

In a typical compressor using a combustible gas, such as boil-off gas and the like, since the electric motor is separated from the compressor, it may be necessary for a gas sealing device to be disposed in several stages on the rotational shaft. The typical compressor requires continuous supply of an inert gas to the gas sealing device and additional installation of a discharge device for discharging gas having leaked from the gas sealing device. Nevertheless, the typical compressor may be unsafe due to difficulty in complete prevention of gas leakage.

However, in this embodiment, some components of the compressor and the component of the electric motor, that is, the first and second compressor housings 24*a*, 24*b* and the motor housing 12, are integrally formed with each other, and the interior of each of the first and second compressor housings 24*a*, 24*b* and the motor housing 12 is completely blocked from the outside, thereby reducing, minimizing or preventing leakage of the combustible gas.

According to this embodiment, the motor housing 12 is provided with the first and second bearings 18, which adopt a self-lubricating type bearing system, thereby eliminating a need for a separate lubricant supply apparatus while reducing, minimizing or preventing contamination of the boil-off gas by lubricant oil. Contamination of the boil-off gas by the lubricant oil can cause many issues due to coagulation of the lubricant oil in the LNG carrier vessel or in various pieces of equipment or the storage tank provided to the LNG-fueled vessel, which is exposed to cryogenic conditions.

In a typical combustible gas compressor, an impeller part is separated from an electric motor part and a special explosion-proof motor is used. However, according to this embodiment, despite the presence of the air-tightening/heating member 22, the compressor does not completely block a gas such as BOG and is configured to allow the boil-off gas to flow between the first and second compressor housings 24*a*, 24*b* and the motor housing 12. In the compressor with this structure, electric devices including the electric motor 14 are operated in a state that the housings are filled with a combustible gas.

At a site where the combustible gas is used, it is very important to prevent explosion due a combustible gas. To this end, a special explosion-proof electric device is generally used. However, according to this embodiment, a portion provided with the electric motor 14, that is, the interior of the motor housing 12, is filled with a combustible gas and is blocked from supply of oxygen thereto, thereby reducing, minimizing or preventing a risk of explosion. Combustion or explosion require three elements, that is, a combustible material, oxygen, and an ignition source. However, according to this embodiment, the possibility of supplying oxygen to the interior of the motor housing 12 is removed, thereby making it possible to maintain a safer state than a typical explosion-proof device.

The interior of the motor housing 12 is always maintained at a higher pressure than atmospheric pressure, thereby preventing external gases including oxygen from entering the motor housing 12 in any cases. As described above, the boil-off gas can flow from the interior of each of the first and second compressor housings 24*a*, 24*b* towards the motor housing 12. Since the boil-off gas is compressed by the first and second impellers 30*a*, 30*b* inside the first and second compressor housings 24*a*, 24*b*, the boil-off gas having flown into the motor housing 12 can be in a state of being compressed to a higher pressure than atmospheric pressure. As a result, the interior pressure of the motor housing 12 provided with the motor 14 can be maintained at a higher pressure than atmospheric pressure.

For measurement of the interior pressure of the motor housing 12, the motor housing 12 or other portions having the same pressure as the motor housing 12 is provided with a pressure sensor 32 to allow operation of the motor 14 to be automatically stopped if the interior pressure of the motor housing 12 is decreased below atmospheric pressure.

Figure 3:
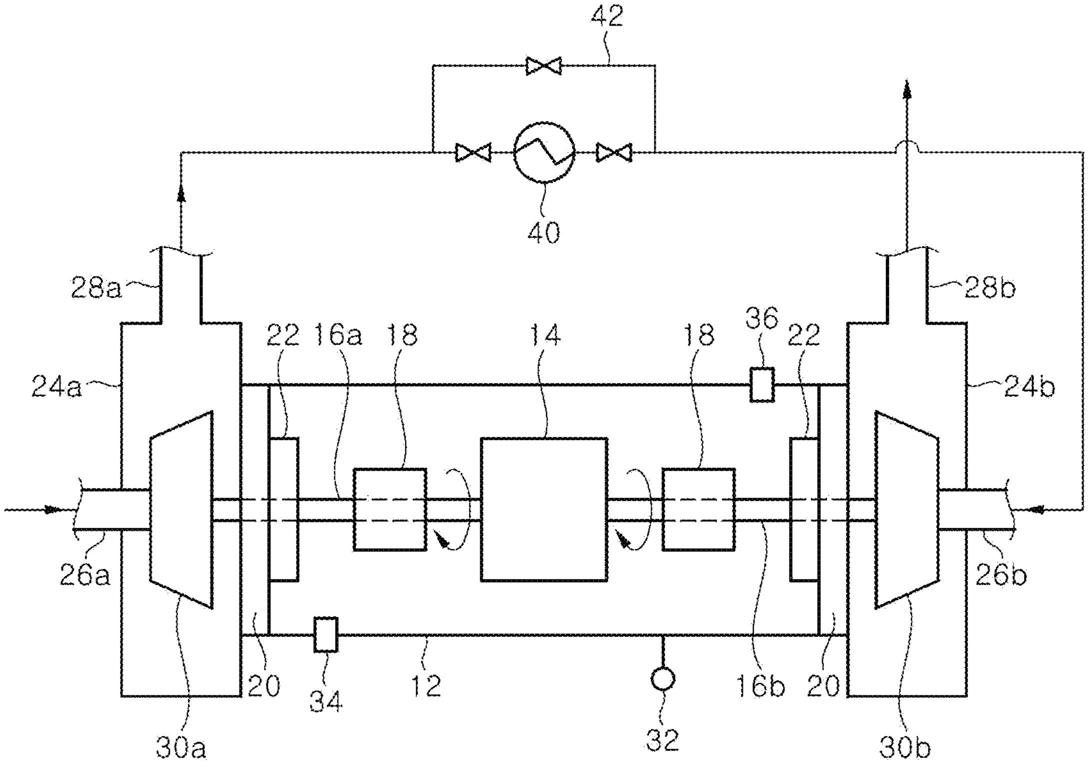
FIG. 3 is a schematic side view of modification of the boil-off gas compressor for LNG-fueled vessels according to one embodiment of the present invention.

FIG. 3 is a schematic side view of a modification of the boil-off gas compressor for LNG-fueled vessels according to one embodiment of the present invention.

Referring to FIG. 3, the boil-off gas compressor 10 according to the modification is similar to the boil-off gas compressor 10 shown in FIG. 2 except that the pipe according to the modification is configured to allow the boil-off gas compressed by the first impeller 30*a* to be additionally compressed by the second impeller 30*b*. The same or like components will be denoted by the same reference numerals and detailed description thereof will be omitted.

Referring to FIG. 3, the boil-off gas compressor 10 may be a two-stage compressor. In the boil-off gas compressor, boil-off gas discharged from a first stage output unit, that is, from the first outlet 28*a*, after being compressed by the first impeller 30*a*, is subjected to heat exchange in an intermediate cooler 40 to reduce the temperature of the boil-off gas, and additionally compressed by the second impeller through a second stage input unit of the compressor, that is, through the second inlet 26*b*. Further, when the boil-off gas discharged through the first stage output unit has a low temperature, the boil-off may be directly supplied to the second stage input unit without passing through the intermediate cooler. To this end, the boil-off gas compressor 10 may be provided with a by-pass line 42 along which the boil-off gas bypasses the intermediate cooler 40.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereto.

What is claimed is:

1. A combustible gas compressor comprising:
- a compressor housing;
- an impeller disposed in the compressor housing and configured to rotate to compress a combustible gas;
- a motor housing;
- a motor disposed in the motor housing and configured to drive the impeller disposed in the compressor housing;
- a partition wall disposed between the compressor housing and the motor housing;
- a rotational shaft connecting the motor and the impeller and configured to transmit rotation driving force of the motor to the impeller; and
- a first bearing configured to support the rotational shaft; and
- a second bearing configured to support the rotational shaft,
- wherein the first bearing and the second bearing are disposed in the motor housing, and the motor is interposed between the first bearing and the second bearing,
- wherein the first bearing is spaced from the partition wall and disposed between the partition wall and the motor, the first bearing being configured to lift the rotational shaft such that a bearing gap is formed between the first bearing and the rotational shaft,
- wherein the compressor housing and the motor housing are integrally formed and partitioned by the partition wall,
- wherein there is a leakage gap between the partition wall and the rotational shaft,
- wherein the compressor housing is in fluid communication with the motor housing through the leakage gap between the rotational shaft and the partition wall configured to allow the combustible gas to leak from the compressor housing to the motor housing through the leakage gap between the rotational shaft and the partition wall such that the combustible gas received in the motor housing causes a pressure inside the motor housing to be higher than atmospheric pressure and inhibit external oxygen from flowing into the motor housing.

2. The combustible gas compressor according to claim 1, wherein the motor is driven by a high speed frequency inverter and the impeller is directly connected to the motor without a separate set-up gear.

3. The combustible gas compressor according to claim 1, further comprising a secondary compressor housing and a secondary impeller disposed in the secondary compressor housing, wherein the impeller and the compressor housing is disposed at one of both sides of the motor housing, and the secondary impeller and the secondary compressor housing are disposed at the other of both sides of the motor housing.

4. The combustible gas compressor according to claim 3, wherein the compressor housing and the secondary compressor housing are connected to each other such that the combustible gas compressed while passing through the impeller is cooled by an intermediate cooler and then supplied to the secondary impeller such that the combustible gas is additionally compressed by the secondary impeller.

5. The combustible gas compressor according to claim 1, wherein the partition wall between the motor housing and the compressor housing comprises a heat insulating member.

6. The combustible gas compressor according to claim 1, further comprising:
- a pressure sensor configured to detect a pressure of an interior of the motor housing.

7. The combustible gas compressor according to claim 1, wherein the motor housing comprises a supply hole through which an inert gas is supplied from an exterior to the motor housing and a vent hole through which an interior gas is discharged.

8. The combustible gas compressor according to claim 1, wherein an interior of the motor housing is filled with the combustible gas.

9. The combustible gas compressor according to claim 1, wherein the first bearing is a self-lubricating type bearing not using lubricant oil.

* * * * *